Jan. 14, 1969 W. G. FREISE ETAL 3,421,430
BEVERAGE DISPENSING DEVICE
Filed Aug. 3, 1965

INVENTORS
William G. Freise and
Benjamin M. Przybyszewski
by Mullin and Alter
Attys

INVENTORS
William G. Freise and
Benjamin M. Przybyszewski
by Mullin and Alter
Attys Jan. 14, 1969 W. G. FREISE ETAL 3,421,430
BEVERAGE DISPENSING DEVICE
Filed Aug. 3, 1965

INVENTORS
William G. Freise
Benjamin M. Przybyszewski
by Mullin and Alter
Attys

INVENTORS
William G. Freise
Benjamin M. Przybyszewski
by Mullin and Alter
Att'ys

United States Patent Office 3,421,430
Patented Jan. 14, 1969

3,421,430
BEVERAGE DISPENSING DEVICE
William G. Freise and Benjamin M. Przybyszewski,
Chicago, Ill., assignors to Paymax Syrup Corporation, Chicago, Ill., a corporation of Illinois
Filed Aug. 3, 1965, Ser. No. 476,977
U.S. Cl. 99—289                15 Claims
Int. Cl. A23f This invention relates to a liquid dispensing device for beverages and, more particularly, to a liquid dispensing device that enables the individual brewing of beverages.

In brewing beverages individually for dispensing in the vending industry the flavor thereof is of primary importance. Although liquid dispensing devices in the past have individually brewed beverages, mechanical failure usually rendered them incapable of dispensing tasty beverages. Our device in obviating the probability of mechanical failure by mechanical simplicity not only accomplishes individual brewing, but also dispenses beverages which are both flavorful and appealing. It should be understood, that although we will describe our device with relation to coffee and tea brewing, our device is equally adapted to other comparable beverages. It is therefore a primary object of this invention to provide a new and improved beverage dispensing device which brews coffee that is tasty with a structure which is both simple and foolproof in operation.

It is still further an object of this invention to produce a new and improved beverage dispensing device that individually brews coffee for vending purposes.

It is still even further an object of this invention to provide a beverage dispensing device for brewing tea wherein the strength of the tea can be selectively chosen in accordance with the tastes of the operator.

To accomplish the aforestated main objectives of both taste and simplicity in mechanical operation an important feature of our device has to do with a new and improved hot water feeding system that delivers a pre-selected quantity of hot water for brewing purposes.

Still another feature included, is a new and improved brewing device that comprises a plurality of brewing chambers and is associated with cleaning means whereby the brewing chambers that are not in use can be cleaned.

Even still another feature incorporated in our invention includes a new and improved arrangement for feeding and disposing of the filter paper used in brewing beverages such as coffee, whereby fresh filter paper is used each time a beverage is brewed therein.

Still even further, our liquid dispensing device incorporates a new and improved tea bag dispenser which furnishes individual bags of tea for selectable brewing thereof with hot water.

Another feature of our invention resides in the provision of electrical means for controlling the brewing time of our new and improved brewing device in accordance with the actual time it takes for the hot liquid to be forced through the brewing chamber and filter paper.

Other and further objects and features of our invention will become more readily apparent from the following description when read in conjunction with the drawing wherein.

Referring generally to the drawings, the improvements contributed by our beverage dispensing device can be said to reside in two general areas—our tea bag dispenser and our improved coffee brewing arrangement. Our tea bag dispenser automatically dispenses tea bags individually along with hot water from the machine so that the operator of the machine can mix the tea with the hot water to produce tea of varying strength. Our new brewing arrangement brews coffee individually with mechanical simplicity and includes the aforestated new features relating to predetermined feeding of hot water, feeding and dispensing the filter paper so that new filter paper can be used for brewing each cup of coffee, keeping the brewing chamber clean and finally electrically controlling the length of brewing time in accordance with the actual mixing of the hot water and coffee. Since the sequence of operations of our device is controlled by conventional timing motor operated cams and switches and the circuitry with regard to same is generally well known, the description of the circuitry, with the exception of our electrical means for controlling the length of brewing in accordance with the actual mixing of the hot water and coffee will here be omitted.

Figure 1:
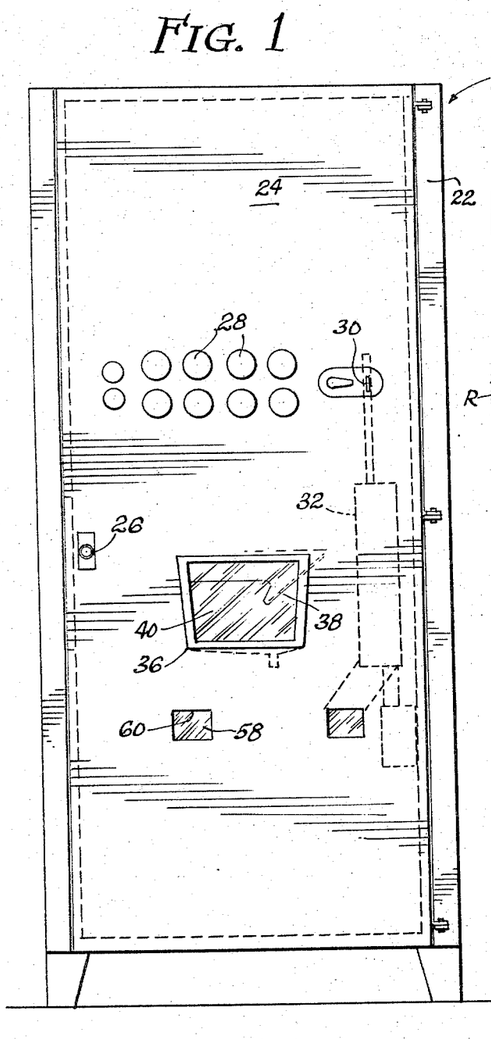
FIG. 1 is a side elevational view of the front of our new and improved beverage dispensing device when the door thereof is closed.

Referring more particularly to the drawings wherein like characters of reference indicate corresponding parts throughout, the front of our new and improved beverage dispensing device 20 is generally illustrated in FIG. 1. As in other vending devices, it is housed in a cabinet 22 which has a front door 24 hingedly associated therewith, said front door having a key locked 26 for security means. Various actuating buttons 28 protrude through the front door 24 to enable the operator of our dispensing device to select a desired drink by actuation thereof after a coin has ben inserted in the coin slot 30. The coin slot 30 is associated with a coin acceptance machine 32 in the usual and well-known manner so that when a coin is inserted in the coin slot the beverage dispensing device is actuated into operation. Once the vending machine is actuated into operation, the beverage to be dispensed is brewed and a cup (not shown) is disposed in a cup magazine 36 via a cup chute 38 and thereafter receives the brewed beverage. The cup magazine 36 which has an access door 40 is opened and access to the cup and beverage contained therein is gained.

Figure 2:
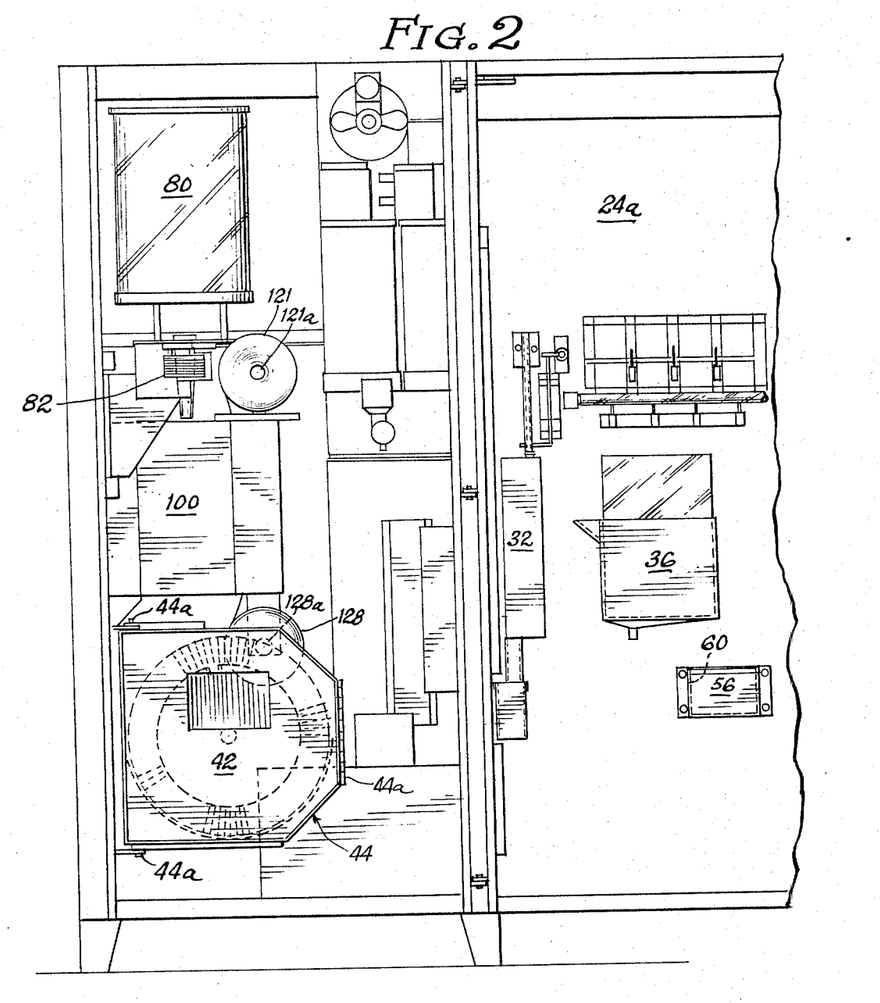
FIG. 2 is a side elevational view of the front or our new and improved beverage dispensing device with the front door thereof opened.

Referring to FIG. 2, the front of the inside of the beverage dispensing device 20 can be seen together with the back 24a of the front door 24. Our new and improved tea bag dispenser 42 is preferably illustrated as being proximately disposed to the bottom of our device.

Figure 3:
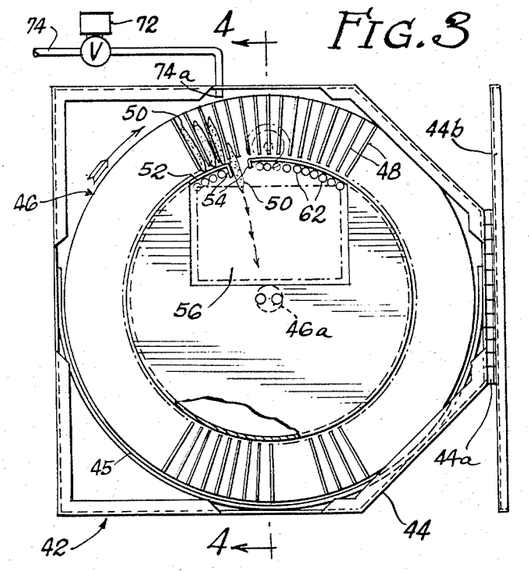
FIG. 3 is a side elevational view of our new and improved tea bag dispenser with the cover thereof in its open position.
Figure 4:
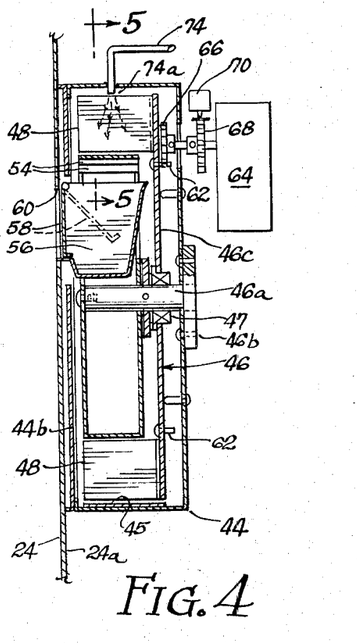
FIG. 4 is a sectional view of FIG. 3 taken along a plane passing through the line 4—4 and looking in the direction indicated.
Figure 5:
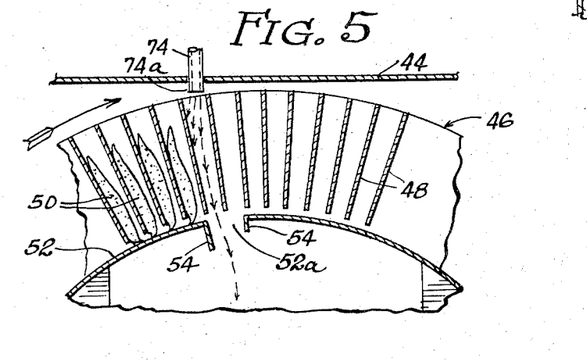
FIG. 5 is a partial enlarged sectional view of FIG. 4 taken on a plane passing through the line 5—5 and looking in the direction indicated.

The tea bag dispenser 42 comprises a polygonal casing 44 which is hingedly associated at one side thereof at 44a to the cabinet 22 of the beverage dispensing device so that it can be swung out when access to the back of the beverage dispensing device is desired. The casing 44 of the tea bag dispenser has a cover 44b hingedly associated therewith as shown in FIG. 3 where it is in its open position. As seen in FIGS. 3 and 4, the tea bag dispenser has a vaned wheel 46 rotatably journalled therein at the central shaft 46a thereof by sealed bearing means 47. The central shaft 46a is rigidly associated with the back of the polygonal casing 44 by means of the plate member 46b. Vanes 48 are spaced apart around the periphery of the wheel 46 in order that tea bags such as 50 can be stored therein and selectively dispensed. An inner casing 52 prevents the tea bags from being dispensed as the wheel 46 rotates until the vanes are aligned with the opening 52a of the inner casing as illustrated in FIGS. 3 and 5.

Figure 6:
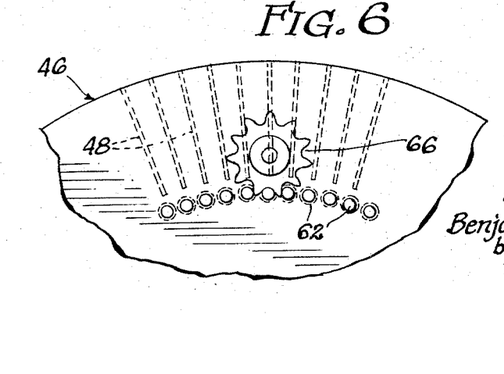
FIG. 6 is an enlarged fragmentary view of FIG. 3 illustrating the driving sprocket of our new and improved tea bag dispenser.

To prevent the tea bags from falling out of the vanes 48, an arcuate rim 45 conforming to the outer periphery of the vaned wheel 46 is associated with the polygonal casing 44 and proximately disposed with relation to the bottom of the vaned wheel. Chute members 54 extend from the inner casing at the opening 52a to guide the tea bags into a tea bag magazine 56 which extends from the back 24a of the front door 24 and is disposed as illustrated in FIG. 4 when in operation. The tea bag magazine has an access door 58 hingedly associated therewith and aligned with an access opening 60 which is formed in the front door 24. Sprocket pegs 62 are peripherally disposed around the rear member 46c of the vaned wheel to associate the wheel with a fractional horsepower motor 64 by means of a sprocket 66 which is associated with a cam 68 as illustrated in FIGS. 4 and 6. A cam switch 70 is associated with the cam 68 to stop the motor 64 when it receives an impulse. A conduit 74 having an air valve 72 which controls the flow of compressed air therethrough is associated with the tea bag dispenser 42 and the end 74a of the conduit 74 protrudes through the casing 44 of the tea bag dispenser as illustrated in FIGS. 3, 4 and 5. Therefore when tea bags are proximately disposed with relation to said conduit, the tea bags are forced from the vanes and into the tea bag magazine 56. A solenoid (not shown) triggers the air valve 72 to release the compressed air flowing through the conduit 74 when it is desired to dispense a tea bag. The cam 68 is slotted so that the motor is stopped by the cam switch 70 each time a vane 46 is in position to dispense a tea bag. Thus, the tea bag dispenser can have its vaned wheel rotated fractionally through 360° to dispense all of the tea bags contained therein.

From a description of the operation of our new and improved tea bag dispenser, it can be seen that an individual tea bag can be dispensed from our machine to enable the operator of the machine to brew tea of varying strength with hot water dispensed by our device. In reviewing the sequence of operations of our dispensing machine with relation to brewing tea with our new and improved tea bag dispenser, the operator merely inserts a coin and our machine feeds a predetermined amount of hot water to a cup in the cup magazine as will be explained hereinafter. At the same time, the tea bag dispenser has the vaned wheel thereof actuated by the motor and moved to a position where the cam switch stops the vaned wheel and a tea bag can be forced through the chutes 54 by means of compressed air flowing through the conduit 74. Compressed air is allowed to flow through the end 74a of conduit 74 by releasing the valve 72 when the motor is actuated. After the tea bag is forced out of the vane and through the chutes 54, the motor is off, the valve 72 is closed, and the tea bag dispenser is then ready for another cycle of operation.

Figures 7, 7A, 7B:
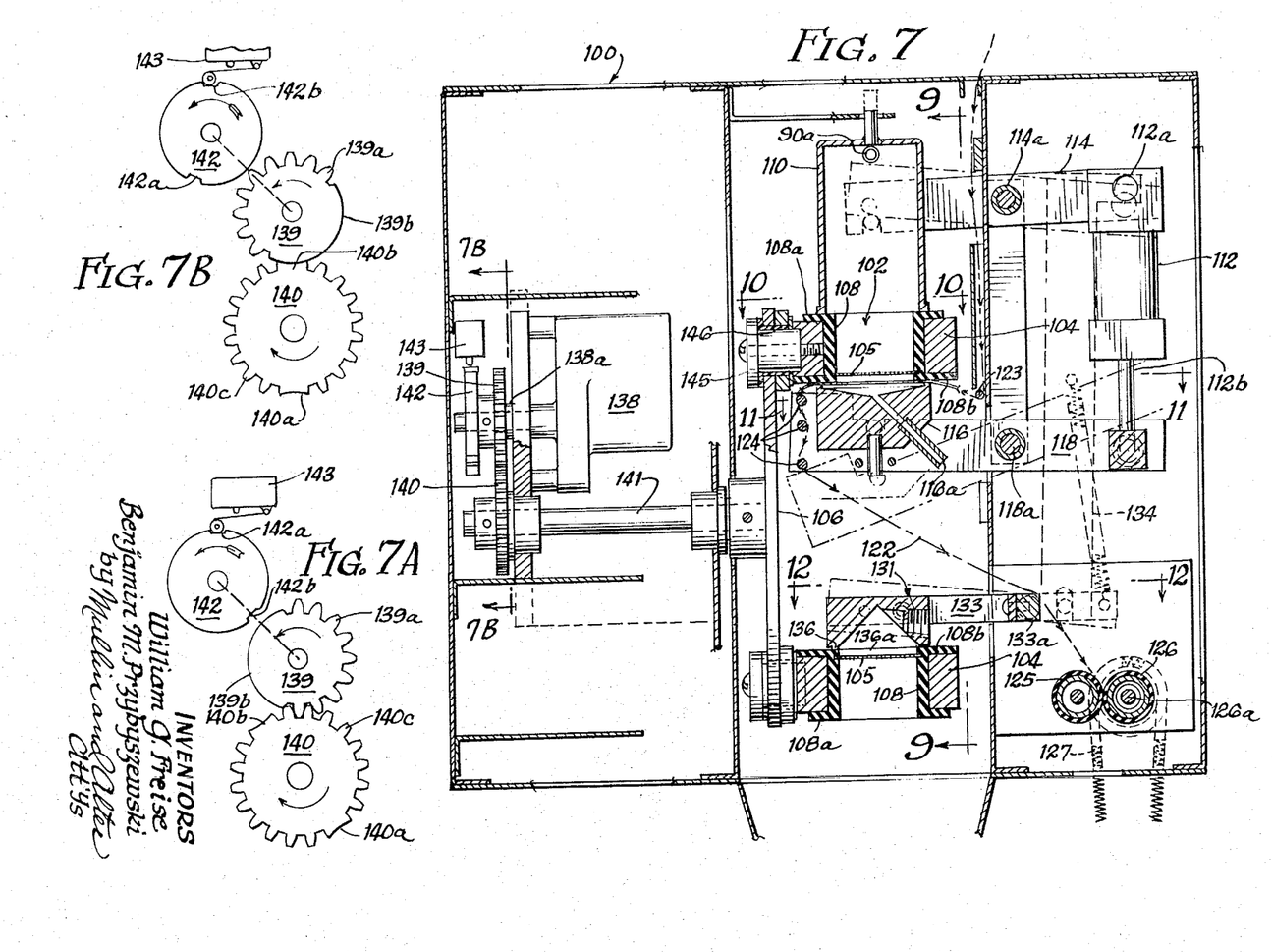
FIG. 7 is a sectional view of our brewing device 100.
FIGS. 7a and 7b are diagrammatic views illustrating the relationship of our geneva gearing mechanism with our cam and cam switch when our coffee brewing device is in both the coffee fill (FIG. 7a) and coffee brew (FIG. 7b) positions.

Our improved coffee brewing arrangement is operatively associated with a storage chamber 80 for fresh coffee as illustrated in FIG. 2 and includes basically a hot water dispensing means 90 and a brewing means 100. As illustrated in FIG. 7, the brewing means preferably includes two brewing chambers (first and second) that are formed from discs 104, which are fixedly mounted to a plate or brewing wheel 106, preferably 180° apart from each other along the periphery thereof. The brewing chambers are preferably of cylindrical shape and are formed by boring the discs 104 at the center thereof. Channel shaped gaskets 108 are associated with the discs 104 and have the ends 108a, 108b covering the top and bottom of the discs respectively. The gaskets have filter screens 105 received therein. The plate 106 is rotatably mounted and is rotatably driven as will be more fully described hereinafter.

A cup 110, which is connected to the hot water dispensing means 90, is connected to first ends 112a of a pair of air pistons 112 by means of a pair of pivotally mounted first connecting arms 114 which rotate about the point 114a. An urn 116 is attached to a pair of second connecting arms 118 which pivot about the point 118a and each have one end thereof connected with second ends 112b of the air pistons 112.

A first roll of filter paper 121 is rotatably mounted at 121a and one end 122 thereof extends through the brewing device around pulley 123, over and around the urn 116 by way of a series of rollers 124 through a pair of nip rollers 125 and 126, and finally it is connected to a spindle 128a to form a second or take up roll 128 at the bottom of the brewing means 100. The spindle 128a is connected in a driven relationship to the roller 126 which is, in turn, rotatably driven by a motor 126a by means of a spring belt 127. Thus, when the motor drives the spindle 128a and causes the filter paper 122 to wind therearound and form the second roll 128, the slower speed of the second roll 128 is compensated for by slippage of the spring belt 127. The motor moves the filter paper in accordance with each coffee brewing cycle so that fresh filter paper is always under the urn 116 when fresh coffee is being brewed.

An air clean out means 131 is attached to a pair of third connecting members 133 which are pivoted about 133a and each has an end thereof associated with the first ends 112a of the air pistons 112 by means of a pair of connecting rods 134. The air clean out means is connected to a supply of compressed air (not shown) and it has a gasket 136 which is formed for sealing association with the ends 108b of the gasket 108. The gaskets 136 have an opening 136a at the center thereof which is the same size as the opening in the brewing chambers 102. Thus, when compressed air is caused to move through the opening 136a it is directed through one of the brewing chambers 102 to clean the same.

The fresh coffee storage chamber 80 feeds coffee to one of the brewing chambers 102 by means of gravity when the nozzle 81 connected to the bottom thereof is opened and disposed to feed coffee to one of the brewing chambers 102. When a coin is inserted in our dispensing device the nozzle 81 is preferably opened by means of a motor 82 that is associated with a switch (not shown). As seen from FIG. 8, the nozzle 81 is mounted on a grommet 83 and is preferably flexible. The nozzle is naturally biased in an outward direction by a spring 81a. However, a loading spring 84, which extends from the brewing means 100, (as illustrated in FIG. 8) forces the nozzle inward and the nozzle guides the coffee into the coffee brewing chambers 102 when they are positioned proximate to the nozzle 81.

Figure 8:
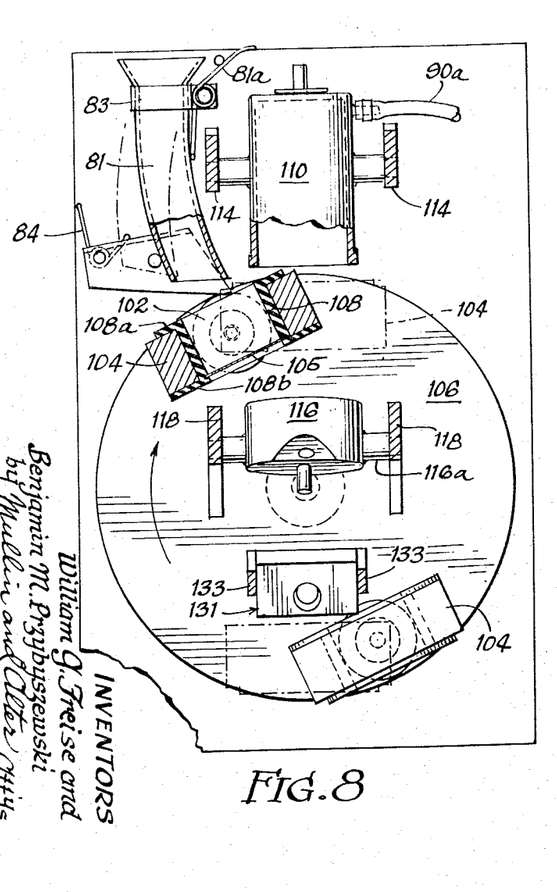
FIG. 8 is a partial sectional view of our brewing device 100 when the same is in its coffee fill position.
Figure 9:
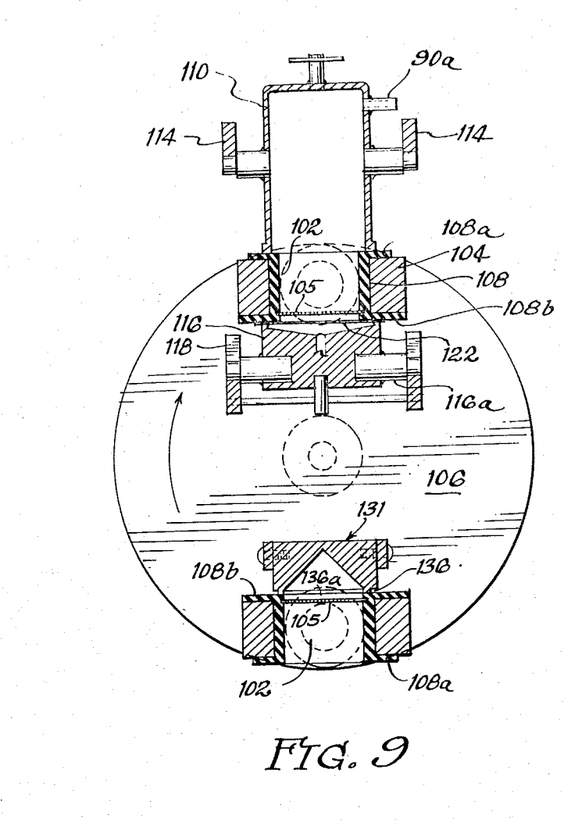
FIG. 9 is a partial sectional view of our brewing device in its coffee brew position taken along a plane passing through the line 9—9 in FIG. 7 and looking in the direction indicated.

The coffee brewing means 100 has a coffee loading position as illustrated in FIG. 8 and a coffee brewing position as illustrated in FIG. 9. The brewing means 100 is actuated to these two positions by means of a fractional horsepower motor 138 which drives a geneva gearing mechanism including a driving gear 139 and a driven gear 140. The driven gear 140 is rigidly associated with the plate 106 by means of the shaft 141. The motor 138 is controlled by means of a cam 142 and a cam switch 143 that are operatively associated with the drive shaft 138a of the motor along with the driving gear 139. The driving gear has teeth 139a and a smooth idling surface 139b; and the driven gear 140 has two smooth idling surfaces 140a, 140b, positioned 180° apart between teeth 140c formed around the periphery thereof. The cam has a pair of notches 142a, 142b formed therein for locking the motor in the coffee fill and coffee brew positions as illustrated respectively in FIGS. 7a and 7b.

In FIG. 7a, which illustrates the coffee fill position, the relative positions of the cam 142 and the gears 139, 140 are illustrated. In this position one of the coffee brewing chambers 102 is positioned, as illustrated in FIG. 8, to receive fresh coffee therein. It will be noted that in this coffee fill position, the cam switch 143 has locked the motor 138 by way of the notch 142a. After a predetermined time, the motor 138 is actuated to cause the brewing chambers 102 to move to the coffee brewing position illustrated in FIG. 9. The brewing chambers 102 and motor 138 are locked in this position for a predetermined time by means of the notch 142b of cam 142 being in locking relationship with the cam switch 143 as illustrated in FIG. 7b. Thereafter, the air pistons 112 cause the cup 110 to be forced against the gasket 108 at the ends 108a in sealed relation. Then the hot water dispenser means 90, which is connected thereto by way of the conduit 90a feeds a predetermined amount of hot water to the cup 110. At the same time of forcing the cup 110 against gasket 108, the second ends 112b of the air compressor cause the urn 116 and filter paper 122 to be forced up against the gasket 108 at the other side of the brewing chamber against the ends 108b in sealed relationship. Hot water is then forced into the cup 110, through the brewing chamber 102 which has coffee therein, through the filter paper 122, and finally to and through the urn 116, whereupon coffee is produced and the urn 116 thereafter feeds the coffee through a conduit 116a to a cup (not shown) for dispensing. At the same time and coincident therewith as this operation proceeds the second ends 112b of the air piston 112 cause the third connecting arms to urge the gasket 136 of the cleaning means 131 against the gasket 108 of the other brewing chamber 102, whereupon air is forced through the cleaning means and through the brewing chamber to clean said brewing chamber.

After a predetermined amount of hot water is fed to the cup 110 for brewing, the motor 138 is actuated and the driving gear 139 has its idling surface 139b ride along the idling surface 140b of the driven gear 140 until the teeth 139a of the driving gear mesh with the teeth 140c of the driven gear. When the teeth of the gears mesh, the theoretical time for brewing the coffee has elapsed, and the air pistons 112 thereupon cause the cup 110 and air cleaning means 131 to be raised and the urn 116 to be lowered as illustrated by the dotted lines of FIG. 7. Then the coffee brewing chambers 102 are rotated back to the coffee fill position for a new cycle as illustrated in FIG. 8 where they are locked in position by means of the cam 142 and cam switch 143 being in locking relationship via the notch 142a as illustrated in FIG. 7a.

Figure 10:
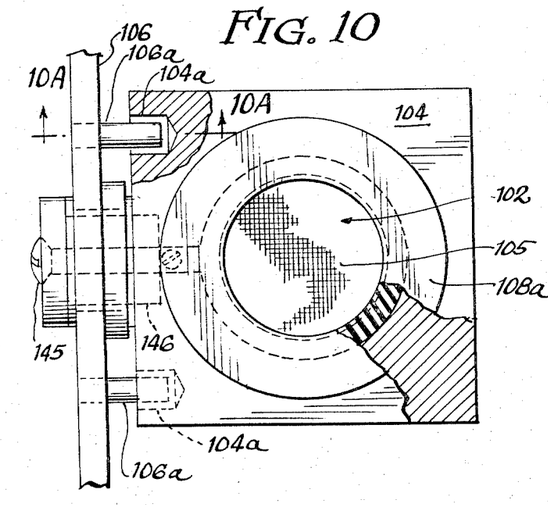
FIG. 10 is a partial sectional view taken along a plane passing through the line 10—10 in FIG. 7 and looking in the direction of the arrows.
Figure 10A:
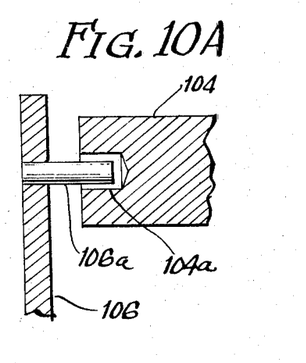
FIG. 10a is a partial sectional view of FIG. 10 taken along a plane passing through the line A—A and looking in the direction of the arrows.
Figure 11:
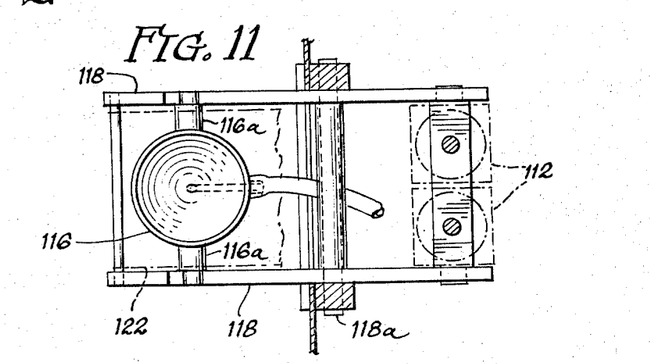
FIG. 11 is a partial sectional view of FIG. 7 taken along a plane passing through the line 11—11 and looking in the direction of the arrows.
Figure 12:
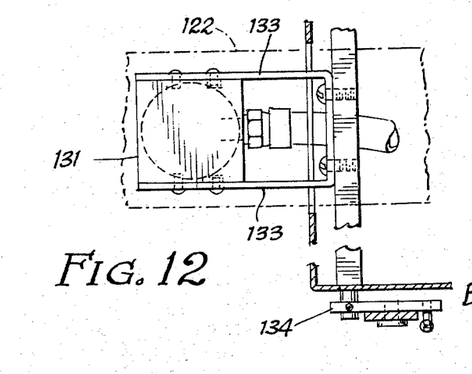
FIG. 12 is a partial sectional view of FIG. 7 taken along a plane passing through the line 12—12 and looking in the direction of the arrows.

It should be noted that in order to achieve sealing relationships between the parts, the parts such as the cup, brewing chambers, and urn are mounted so that they can wobble. Thus, as can be seen from FIGS. 7 and 10, the discs 104 of our brewing chambers 102 are threadedly mounted to the plate 106 at the center thereof with bolts 145 which preferably protrude through nylon bushings 146 that are associated with the plate 106. This arrangement enables the discs 104 to wobble or rotate slightly for alignment purposes. To restrain the discs 104 from undue wobbling or rotation, pegs 106a extend from the plate 106 and protrude through bored holes 104a of the discs 104 which are greater in diameter than the pegs 106a. It will be noted that all of the remaining members such as the cup 110, the urn 116, and the air cleaning means 131 are pivotally associated with their respective connecting members 114, 118, 133, to allow for tolerant wobbling. In FIG. 11, the urn 116 is illustrated as being pivotally interposed between the connecting members 118 by means of a shaft 116a that is rotatably associated with connecting members 118 at each side thereof.

Figure 13A:
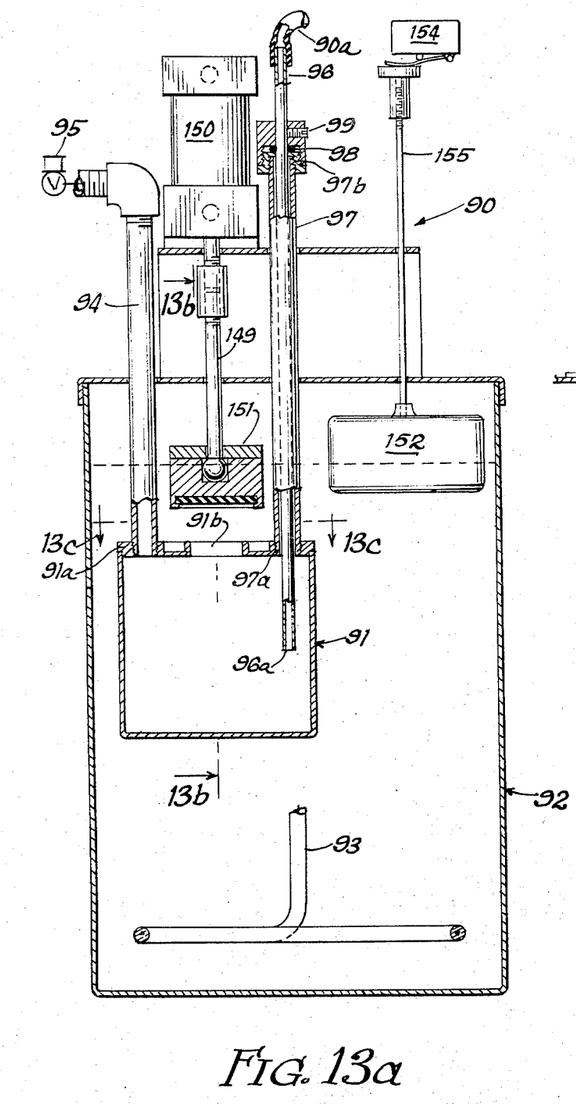
FIG. 13a is a partial cross sectional view of our hot water dispensing device.
Figure 13B:
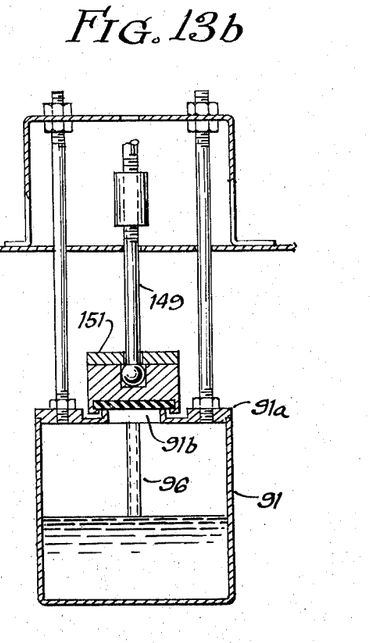
FIG. 13b is a partial sectional view of FIG. 13a taken along a plane passing through the line b—b looking in the direction indicated.
Figure 13C:
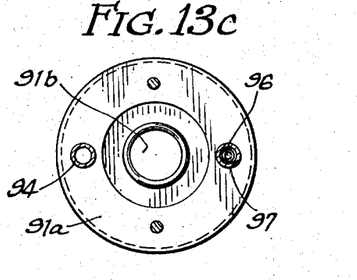
FIG. 13c is a partial sectional view of FIG. 13a taken along a plane passing through the line c—c and looking in the direction indicated.

In order to insure that the coffee is completely brewed and has passed through the conduit 116a, before the cup 110, urn 116 and cleaning means 131 are moved from the coffee brew position, we have provided a pair of electrodes 147, 148 as illustrated in FIG. 13. The electrodes are disposed in conduit 116a leading from the coffee urn 116 to the point where the brewed coffee is ultimately dispensed. With this arrangement if, for any reason, the brewing time of the coffee is slowed, and there still is coffee flowing through the conduit 116a, the electrodes 147, 148 are electrically associated with the timer motor for the coffee brewing device to stall the sequence of operations of the motor operated timing cams for our liquid dispensing device until the brewed coffee has passed through the conduit 116a.

Figure 14:
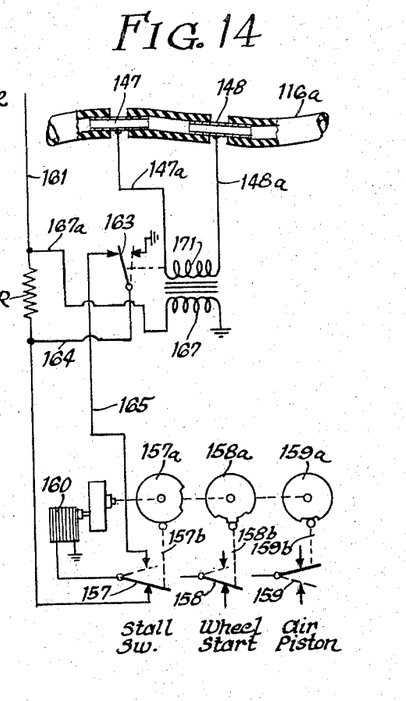
FIG. 14 is a diagrammatic view illustrating the circuitry of our electrical means for controlling the brewing time of our new and improved brewing device.

As mentioned before, our beverage dispensing device is operated by a series of timer motors that operate a series of cams to actuate the circuits of our device sequentially. As in other well known circuits such as disclosed in United States patents, Nos. 2,813,965; 2,953,171; 2,935,010; each of the sequential operations of our device is interrelated and the preceding operation must be completed before the next operation is set into motion. To illustrate how our electrodes work with regard to a series of motor operated cams and switches, in FIG. 14 we show a series of motor operated cams that could be used to actuate our brewing device. It will be noted that a spring biased stall switch 157 is electrically connected in series with a wheel start switch 158, and a spring biased air piston switch 159. All of the switches have follower mechanisms 157b, 158b and 159b that make them adaptable for association with cams. The stall switch 157 is mechanically associated with a stall cam 157a as are the wheel start cam 158a and the air piston cam 159a. All of the cams 157a, 158a and 159a are rotatably mounted on the shaft of the coffee timer motor and have grooves therein for allowing the switches to close when the grooves are in alignment with the followers 157b, 158b and 159b on the spring biased switches 157, 158 and 159. When the followers are so aligned, the wheel and the air piston can be actuated by various circuits (not shown). It will be noted that one side of the stall switch is connected to an electrode relay 163 by means of a lead 165. The electrode relay 163 is shown in its normally closed position and in this position voltage from the hot lead 161 can be impressed on the stall switch 157 when it moves into its closed position which is illustrated in dotted lines. A primary coil 167 which is grounded on one side is also connected to the hot lead 161 by means of the lead 167a. A secondary coil 171 is proximately disposed with relation to said primary coil and is electrically connected to the electrodes 147, 148 by means of the leads 147a, 147b. Thus, when current can flow between the electrodes 147 and 148, a circuit is completed in the secondary coil and the electrode relay 163 is actuated to its closed position which is shown in dotted lines. In its closed position the electrode relay 163 is grounded. When the electrode relay is in its closed position, current normally flowing to the timer motor flows through the resistance R and is clamped to ground by flowing through the electrode relay 163 and lead 164. Thus, all of the cams riding on the coffee timer motor, which is de-energized, are halted. The sequence of operations in our dispensing device is stopped until there is no longer any current flowing between the electrodes 147, 148 and the electrodes relay is in its normal closed position. Thus it can be seen without going into detail as to the operations of the rest of the cams and switches that once here is no longer any liquid flowing through the conduit 116a, the electrode relay 163 is in its closed position and the normal sequence of operation of the coffee brewing mechanism can proceed in accordance with the time sequence of the motor operated cams as has been explained in the aforementioned United States patents.

To provide our beverage dispensing machine with a predetermined amount of hot water for either brewing coffee or tea as has been above described, our hot water dispensing device 90 is associated with the conduit 90a. Our hot water dispensing device 90 comprises a small tank 91 disposed within a large tank 92. The large tank 92 has a heater 93 located therein for heating water disposed in it. The small tank is associated with compressed air by means of a conduit 94 which has a valve 95 that is released when it is desired to deliver a predetermined amount of hot water to the conduit 90a which communicates with the tank 91 through a dispensing conduit 96. The dispensing conduit extends through a tubular casing 97 which has a first end 97a threadedly associated with the top 91a of the small tank 91. The tubular casing 97 has a second end 97b which is threadedly associated with a bushing 98 that has set screw 99 associated therewith and disposed to adjustably hold the dispensing conduit in position. It therefore will been seen that the position of the lower end 96a of the dispensing conduit 96 can be selectively located with respect to the top and bottom of the tank 91. The top 91a of the tank 91 has a large opening 91b, submerged below the water level of the large tank, through which hot water from the large tank 92 flows when it is desired to fill the small tank 91 with hot water. To control the flow of hot water through the opening 91b an air piston 150 has a gasketed diaphragm 151 attached thereto by means of a shaft 149 and the gasketed diaphragm is moved reciprocatingly from an open position illustrated in FIG. 13a to a closed position illustrated in FIG. 13b where the gasketed diaphragm blocks the opening 91b and prevents the flow of water through said opening. When it is desired to feed a predetermined amount of hot water to the conduit 90a, the air piston 150 merely actuates the gasketed diaphragm to its closed position illustrated in FIG. 13b, and then the valve 95 is released and compressed air forces the hot water in the small tank 91 through the bottom 96a of the dispensing conduit 96 to the conduit 90a. With this type of arrangement, the amount of water dispensed from the small tank 91 is completely dependent on the position of the lower end 96a of the dispensing conduit with respect to the bottom of the small tank 91. The small tank 91 can only feed water to the conduit 90a as long as the lower end 96a of the dispensing conduit 96 is in communication with the water level. Thus, if the small tank 91 was completely filled and the dispensing conduit was positioned as illustrated in FIG. 13a, the small tank would dispense water until the position of the water level was aligned with the lower end of the dispensing conduit 96a as illustrated in FIG. 13b. Once a predetermined amount of water is fed to the conduit 90a, the valve 95 is closed and the piston 150 is moved to its open position to enable a fresh supply of hot water to be delivered to the small tank 91.

To automatically replenish the level of water in the large tank 92 we have provided a float 152 which is electrically associated with switch 154 by means of a stem 155 that extends from the float to the switch. When the water level drops below a certain point, and electric contact is no longer made with the switch 154, a valve (not shown) which is associated with the swtich 154 in the conventional manner allows more water to be fed to the tank 92.

It is believed that our invention, its mode of construction and assembly, and many of its advantages should be readily understood from the foregoing without further description, and it should also be manifest that while a preferred embodiment of the invention has been shown and described for illustrative purposes, the structural details are nevertheless capable of wide variation within the purview of our invention as defined in the appended claims.

What is claimed is:

1. A beverage dispensing device having a brewing arrangement that brews beverage individually comprising: a brewing device having a rotating wheel, a pair of brewing chambers mounted on said wheel, brewing and cleaning means operably associated with said wheel to brew coffee with one of said brewing chambers while simultaneously cleaning the other of said brewing chambers whereby each of said brewing chambers can be successively used while the brewing chamber not in use is cleaned and means for providing a predetermined quantity of water to the brewing chamber for brewing the beverage.

2. A beverage dispensing device, as defined in claim 1, said brewing chambers having a brew position, said brewing chambers being spaced apart from each other along said wheel, and means for actuating said wheel to move each of said brewing chambers into said brew position after the other of said brewing chambers has been cleaned.

3. A beverage dispensing device, as defined in claim 2, said brewing chambers being spaced 180° from each other, a cup, said means for providing a predetermined quantity of water comprising hot water dispensing means communicating with said cup, said cup being disposed proximate to the top of said wheel where one of said brewing chambers is disposed when said wheel is in said brew position, an urn disposed underneath and proximate to said one of said brewing chambers when said wheel is in said brew position, a cleaning means disposed proximate to the other of said brewing chambers when said wheel is in said brew position, means for clamping said one of said brewing chambers between said cup and urn to brew a beverage when hot water is dispensed from said hot water dispensing means, and means for actuating said cleaning means to clean said other brewing chamber.

4. A beverage dispensing device, as defined in claim 3, each of said brewing chambers having a fill position, means for storing a flavorant, dispensing means associated with said means for storing, said dispensing means loading a predetermined amount of flavorant into one of said brewing chambers when each of said brewing chambers is in said fill position.

5. A beverage dispensing device as defined in claim 4, wherein said means for clamping comprises: an air piston having a first end and a second end, a first pivotally mounted connecting arm having one end associated with said cup, said first pivotally mounted connecting arm having another end associated with said first end of said air piston, a second pivotally mounted connecting arm having one end attached to said urn and the other end attached to said second end of said air piston, said air piston causing said cup to be forced downward and said urn to be forced upward to clamp one of said brewing chambers therebetween when one of said brewing chambers is in said brew position and means for causing said hot water dispensing means to force a predetermined amount of hot water through said cup, brewing chamber and urn to brew beverage by passing through said flavorant.

6. A beverage dispensing device as defined in claim 5, including: means for causing said air piston to be actuated to move said cup upward and said urn downward after said beverage has been brewed, a motor associated with said wheel to rotate said wheel and means for controlling said motor to rotate said wheel to said fill position to enable said other cleaned brewing chamber to be filled with flavorant.

7. In a beverage dispensing device, as defined in claim 6, a filter paper arrangement including: a first fresh roll of filter paper having a free end and being rotatably journalled in said dispensing machine, a spindle, said free end of filter paper passing through said brewing means over said urn, said free end being associated with said spindle, said filter paper being interposed between said brewing chamber and said urn to filter said beverage as it is being brewed before it passes through said urn, means for selectively and rotatably driving said spindle in sufficient increments to cause fresh filter paper to be furnished to said brewing device, said free end of said filter paper forming a second take up roll of used filter paper on said spindle whereby said take up roll can be disposed of when said first fresh roll of filter paper is exhausted.

8. The beverage dispensing device of claim 3 wherein the brewing means thereof for brewing beverages requires the use of filter paper, a filter paper arrangement comprising: a fresh roll of filter paper having a free end of filter paper and being rotatably journalled in said dispensing device, a spindle, said free end of filter paper passing through said brewing means and being associated therewith for brewing beverages, said free end of filter paper being associated with said spindle, means for selectively rotatably driving said spindle in sufficient increments to cause fresh filter paper to be furnished to said brewing device for use therein, said free end of said filter paper forming a take up roll of used filter paper on said spindle whereby said take up roll can be disposed of when said fresh roll of filter paper is exhausted.

9. A beverage dispensing device, as defined in claim 8, wherein said rotating means includes a roller rigidly attached to said motor, a spring belt wound around said spindle and said roller whereby said second take up roll is driven in varying increments in accordance with its diameter and the slippage of said spring belt and a channel shaped gasket associated with each brewing chamber, said gasket comprising a cylindrical portion for lining the inside of the brewing chamber and a circular portion for engaging respectively said cup and said urn when the brewing chamber is in the brew position.

10. The beverage dispensing device as defined in claim 2 wherein a cup is associated with one end of one of said brewing chambers when the same is in said brew position, hot water dispensing means communicating with said cup, an urn is disposed at the opposite end of said chamber when the same is in said brew position, a one piece channel shaped gasket including: a cylindrical portion for lining said brewing chamber and a circular portion at each end thereof for engaging respectively said cup and urn in sealing relationship.

11. In a beverage dispensing device as defined in claim 1, wherein said means for providing a predetermined quantity of water to the brewing chamber includes a hot water dispenser comprising: a large tank for heating and storing hot water, a small tank supported in said large tank, said small tank having an opening below the usual water level of said large tank, a diaphragm operatively associated with said opening of said small tank, said diaphragm having an open position and a closed position where it is in sealed relationship with said small tank's opening, said small tank having a supply of compressed air in selective communication therewith, and a dispensing conduit having one end in said small tank, whereby said small tank can deliver a predetermined amount of hot water therefrom to said dispensing conduit by having said diaphragm in its closed position and allowing said compressed air to force said water through said dispensing conduit until the level of the water in said small tank is even with said one end of said dispensing conduits.

12. A beverage dispensing device as defined in claim 11, wherein said opening in said small tank is at the top thereof.

13. In a beverage dispensing device that requires a predetermined amount of hot water for individually brewing beverages, a hot water dispenser comprising: a large tank for heating and storing hot water, a small tank supported in said large tank, said small tank having an opening below the usual water level of said large tank, a diaphragm operatively associated with said opening of said small tank, said diaphragm having an open position and a closed position where it is in sealed relationship with said small tank's opening, said small tank having a supply of compressed air in selective communication therewith, and a dispensing conduit adjustably associated with said small tank, said dispensing conduit protruding in said small tank and having one end selectively positionable with respect to the top and bottom of said small tank, whereby said small tank can deliver a predetermined amount of hot water therefrom to said dispensing conduit by having said diaphragm in its closed position and allowing said compressed air to force said water through said dispensing conduit until the level of the water in said small tank is even with said one end of said dispensing conduits.

14. A beverage dispensing device, as defined in claim 13, wherein said opening in said small tank is at the top thereof.

15. A beverage dispensing device, as defined in claim 13, wherein a casing is associated with the top of said small tank and said dispensing conduit protrudes therethrough downward in said small tank, said dispensing conduit being adjustably associated with said casing.

References Cited

UNITED STATES PATENTS

| | | | |
|---|---|---|---|
| 1,347,884 | 7/1920 | White et al. | 242—67.3 |
| 2,392,452 | 1/1946 | Baumann | 99—289 |
| 2,750,871 | 6/1956 | Landgraber et al. | 99—302 |
| 2,910,928 | 11/1959 | Rota | 99—289 |
| 2,939,380 | 6/1960 | Parraga | 99—289 X |
| 3,194,147 | 7/1965 | Cowley | 99—289 X |
| 3,208,369 | 9/1965 | Greenly et al. | 99—289 X |
| 3,229,401 | 1/1966 | Sobran | 101—9 X |
| 3,229,612 | 1/1966 | Brown | 99—289 X |
| 3,266,410 | 8/1966 | Novi et al. | 99—302 X |

FOREIGN PATENTS

| | | |
|---|---|---|
| 1,319,958 | 1/1963 | France. |
| 1,342,097 | 9/1963 | France. |

ROBERT W. JENKINS, *Primary Examiner.*

U.S. Cl. X.R.

222—373